(12) United States Patent
Kubota et al.

(10) Patent No.: US 8,760,769 B2
(45) Date of Patent: Jun. 24, 2014

(54) ZOOM LENS

(75) Inventors: Yoji Kubota, Nagano (JP); Kenichi Kubota, Nagano (JP); Hitoshi Hirano, Nagano (JP)

(73) Assignees: Optical Logic Inc., Nagano (JP); Kantatsu Co., Ltd., Tochigi (JP)

( * ) Notice: Subject to any disclaimer, the term of this patent is extended or adjusted under 35 U.S.C. 154(b) by 20 days.

(21) Appl. No.: 13/448,653

(22) Filed: Apr. 17, 2012

(65) Prior Publication Data

US 2012/0275033 A1    Nov. 1, 2012

Related U.S. Application Data

(60) Provisional application No. 61/480,197, filed on Apr. 28, 2011.

(51) Int. Cl.
    *G02B 15/14* (2006.01)
(52) U.S. Cl.
    USPC .......................................... 359/682
(58) Field of Classification Search
    USPC .......................................... 359/682
    See application file for complete search history.

(56) References Cited

U.S. PATENT DOCUMENTS

2007/0002461 A1 *   1/2007   Iwasawa ..................... 359/687

FOREIGN PATENT DOCUMENTS

JP    2001-343588    12/2001

OTHER PUBLICATIONS

Notice of Reasons for Rejection for JP Patent Application 2010-100498, Dec. 25, 2013, Japan Patent Office.

* cited by examiner

*Primary Examiner* — James Jones
(74) *Attorney, Agent, or Firm* — Kubotera & Associates LLC

(57) ABSTRACT

A zoom lens includes a first lens group G1 that is negative, a second lens group G2 that is negative, and a third lens group G3 that is positive. The first lens group G1 includes a first lens L1 that is negative and a prism P, and the second lens group G2 includes a second lens L2 that is positive and a third lens L3 that is negative. The third lens group G3 includes a stop ST, a fourth lens L4 that is positive, and a fifth lens L5 that is negative. According to this configuration, upon changing magnification from a wide-angle end to a telephoto end, the first lens group G1 is secured, the second lens group G2 first moves to the image plane side and then moves to the object side, and the third lens group G3 linearly moves to the object side.

6 Claims, 15 Drawing Sheets (Wide-angle end)

(Mid-point)

(Telephoto end)

(Wide-angle end)

Spherical aberration (mm)
1:587.56nm
2:435.84nm
3:656.27nm
4:486.13nm
5:546.07nm Astigmatism (mm)
S: Sagittal
T: Tangential Distortion (%)

(Mid-point)

Spherical aberration (mm)
1:587.56nm
2:435.84nm
3:656.27nm
4:486.13nm
5:546.07nm Astigmatism (mm)
S: Sagittal
T: Tangential Distortion (%)

(Telephoto end)

Spherical aberration (mm)
1:587.56nm
2:435.84nm
3:656.27nm
4:486.13nm
5:546.07nm Astigmatism (mm)
S: Sagittal
T: Tangential Distortion (%)

ZOOM LENS

CROSS-REFERENCE TO RELATED APPLICATIONS

The application claims the benefit under 35 U.S.C. 119(e) of the provisional application No. 61/480,197, filed on Apr. 28, 2011.

BACKGROUND OF THE INVENTION AND RELATED ART STATEMENT

The present invention relates to a zoom lens for forming an image on an imaging element such as a CCD sensor and a CMOS sensor.

In these years, there are studies on mounting a zoom lens on a small device such as a cellular phone, a portable information terminal, and an internet camera as well as a digital still camera for another additional value, and devices actually equipped with zoom lenses became available. A zoom lens is an optical system, in which a part of lenses or lens groups that compose a lens system moves along an optical axis, whereby it is possible to continuously change imaging magnification. Mounting a zoom lens, it is possible to increase and/or decrease an image of an object to any sizes upon taking the image.

In case of mounting such zoom lens onto a small-sized device, the whole length of the zoom lens is preferably as short as possible. In case of a zoom lens, however, since it is necessary to move at least two of lens groups that compose the zoom lens upon changing magnification and focusing, it is required to secure space within the zoom lens to be able to move those lens groups therein, which makes difficult to attain miniaturization of the zoom lens.

On the other hand, the number of pixels to take an image as electrical signals has increased each year, and therefore a zoom lens is also required to exhibit high performances such as satisfactory aberration correction performance and compatibility to high resolution.

Patent Reference has disclosed a zoom lens, which includes a first lens group that is composed of a lens having negative refractive power; a second lens group that is composed of two lenses, a positive and a negative lenses, so as to have negative refractive power as a whole; a third lens group having positive refractive power; and a fourth lens group having positive refractive power. According to this zoom lens, restraining a composite focal length of the first lens group and the second lens group at a wide-angle end within certain length, it is possible to attain relatively satisfactory miniaturization in spite of its highly variable magnification, which is as high as three times.

Patent Reference: Japanese Patent Publication No. 2001-343588

The zoom lens described in Patent Reference does not fully satisfy the demands for high performances and miniaturization, although it is possible to relatively satisfactorily correct aberrations with a small number of lenses.

Here, such demands for high performances and miniaturization are not demanded only in small-sized devices such as cellular phones. Even in devices such as digital still cameras, there is a demand for changing magnification of an image, especially optically changing of magnification with less image deterioration, whereas there is also a demand for a smaller thickness to enhance portability.

In view of the above-described problems, an object of the invention is to provide a small-sized zoom lens with high performances that can provide satisfactory high image quality.

SUMMARY OF THE INVENTION

In order to attain the object described above, according to the present invention, a zoom lens includes a first lens group having negative refractive power; a second lens group having negative refractive power; and a third lens group having positive refractive power, arranged in the order from an object side to an image plane side. The first lens group is composed of a lens having negative refractive power so that a curvature radius of a surface thereof on an image plane side is positive and a light path changing member that changes a traveling direction of an incident light. The second lens group is composed of a lens having positive refractive power so that a curvature radius of a surface thereof on the object side is positive and a lens having negative refractive power so that a curvature radius of a surface thereof on the object side is negative. The third lens group is composed of a lens having positive refractive power and a lens having negative refractive power so that a curvature radius of a surface thereof on the object side is positive.

In addition, the zoom lens of the invention is configured so that, upon changing magnification from a wide-angle end to a telephoto end, the first lens group is secured and at the same time, the second lens group first moves to the image plane side and then moves to the object side, and the third lens group linearly moves to the object side.

According to this configuration, the lens groups that move upon changing magnification and focusing are only two lens groups, i.e. the second lens group and the third lens group. Furthermore, among them, the second lens group is composed of two lenses, a positive lens and a negative lens. Therefore, chromatic aberration of magnification and distortion occurred in the first lens group are satisfactorily corrected. Moreover, since the second lens once moves to the image plane side and then moves to the object side upon changing the magnification from the wide-angle end to the telephoto end, the trajectory of the movement is concave on the object side. According to the zoom lens of the invention, it is possible to minimize space to secure to move the lens groups in comparison with a zoom lens, in which a second lens group linearly or parabolicaly moves. Therefore, employing such configuration in a zoom lens, it is possible to attain both high performances and miniaturization.

In the zoom lens having the above-described configuration, it is possible to use as the light path changing member a prism that reflects an incident light to bend a light path. Using such prism, it is possible to form a bent-type (L-shaped) zoom lens. Especially in case of small-sized portable devices such as cellular phones, space to mount a zoom lens is very limited. According to the invention, it is possible to significantly reduce a thickness of a device to mount a zoom lens.

When a composite focal length of the first lens group, the second lens group, and the third lens group at the wide-angle end is fw and the first lens group has a focal length f1, the zoom lens having the above-described zoom lens preferably satisfies the following conditional expression (1):

$$-0.3 < fw/f1 < -0.05 \quad (1)$$

When the zoom lens satisfies the conditional expression (1), it is possible to restrain an axial chromatic aberration and an off-axis chromatic aberration of magnification within satisfactory ranges, while reducing the length of the zoom lens in a direction of an optical axis. When the value exceeds the upper limit "−0.05", the first lens group has relatively weak refractive power, so that it is necessary to relatively increase the refractive power of the second lens group. In this case, although it is possible to restrain the axial chromatic aberration and the off-axis chromatic aberration of magnification within satisfactory ranges, since the diameter of a lens that composes the first lens group increases, it is difficult to attain miniaturization of the zoom lens. On the other hand, if the value is below the lower limit "−0.3", the first lens group has relatively strong refractive power. Such relatively strong refractive power is advantageous for miniaturization of the zoom lens, but makes difficult to restrain the axial chromatic aberration and the off-axis chromatic aberration of magnification within satisfactory ranges.

When the first lens group has the focal length f1 and the third lens group has a focal length f3, the zoom lens having the above-described configuration preferably satisfies the following conditional expression (2):

$$-0.5 < f3/f1 < -0.1 \quad (2)$$

The conditional expression (2) defines a moving aspect of the second lens group. When the zoom lens satisfies the conditional expression (2), it is possible to keep off-axis image-forming performance at certain level over the whole range of magnification change. When the zoom lens satisfies the conditional expression (2), upon changing magnification, a position of the second lens group on the optical axis at the wide-angle end is almost same as a position of the second lens group on the optical axis at the telephoto end. In other words, when the zoom lens satisfies the conditional expression (2), spacing between the first lens group and the second lens group is the same between at the wide-angle end and at the telephoto end, so that it is possible to suitably attain miniaturization of the zoom lens.

Here, in the conditional expression (2), when the value exceeds the upper limit "−0.1", the first lens group has relatively weak refractive power and the diameter of lens that composes the first lens group increases and also the second lens group significantly moves towards the image plane side at the telephoto end. Therefore, it is difficult to attain miniaturization of the zoom lens. On the other hand, when the value is below the lower limit "−0.5", since the first lens group has relatively strong refractive power, the second lens group significantly moves towards the object side at the telephoto end, so that it is difficult to restrain the axial chromatic aberration, the off-axis chromatic aberration of magnification, and an off-axis coma aberration within satisfactory ranges. Furthermore, it is also difficult to attain miniaturization in this case.

When the second lens group has a focal length f2 and the third lens group has the focal length f3, the zoom lens having the above-described configuration preferably satisfies the following conditional expression (3):

$$-0.6 < f3/f2 < -0.3 \quad (3)$$

When the zoom lens satisfies the conditional expression (3), it is possible to restrain aberrations within satisfactory ranges over the whole magnification changing range. When the value exceeds the upper limit "−0.3", the second lens group has relatively weak refractive power, which is effective to restrain a chromatic aberration within the satisfactory range, but since the second lens group significantly moves towards the image plane side at the telephoto end, it is difficult to attain miniaturization of the zoom lens. Moreover, it is also difficult to correct the off-axis coma aberration and keep flatness of the image surface. On the other hand, when the value is below the lower limit "−0.6", the second lens group has relatively strong refractive power, which is advantageous for miniaturization of the zoom lens. However, for restraining the axial chromatic aberration within the satisfactory range, the off-axis chromatic aberration of magnification is excessively corrected and it is difficult to restrain them in a well balanced manner. Furthermore, an inner coma aberration due to off-axis light increases at the wide-angle side, and an outer coma aberration increases at the telephoto side, so that it is difficult to obtain satisfactory image-forming performance over the whole range of the magnification change.

In addition, when the lens having positive refractive power in the second lens group has Abbe's number vd2p, the lens having negative refractive power in the second lens group has Abbe's number vd2n, the lens having positive refractive power in the third lens group has Abbe's number vd3p, and the lens having negative refractive power in the third lens group has Abbe's number vd3n, the zoom lens having the above-described configuration preferably satisfies the following conditional expression (4):

$$0.5 < |vd2p - vd2n|/|vd3p - vd3n| < 0.8 \quad (4)$$

When the zoom lens satisfies the conditional expression (4), it is possible to restrain the axial chromatic aberration and the off-axis chromatic aberration of magnification within satisfactory ranges in a balanced manner over the whole magnification changing range. When the value exceeds the upper limit "0.8", an image-forming position varies among wavelengths especially at the telephoto side, and the chromatic aberration at a short wavelength is in a plus direction (on the image plane side) in relative to that of a reference wavelength. Therefore, the axial chromatic aberration is excessively corrected and thereby it is difficult to obtain satisfactory image-forming performance over the whole magnification changing range. On the other hand, when the value is below the lower limit "0.5", the chromatic aberration at a short wavelength is in a minus direction (on the object side) in relative to that of a reference wavelength, so that the axial chromatic aberration and the off-axis chromatic aberration of magnification are both insufficiently corrected. Even in this case, it is difficult to obtain satisfactory image-forming performance over the whole magnification changing range.

According to the zoom lens of the invention, it is possible to provide a high-performance small-sized zoom lens that can form high quality images.

DETAILED DESCRIPTION OF PREFERRED EMBODIMENTS

Figure 1:
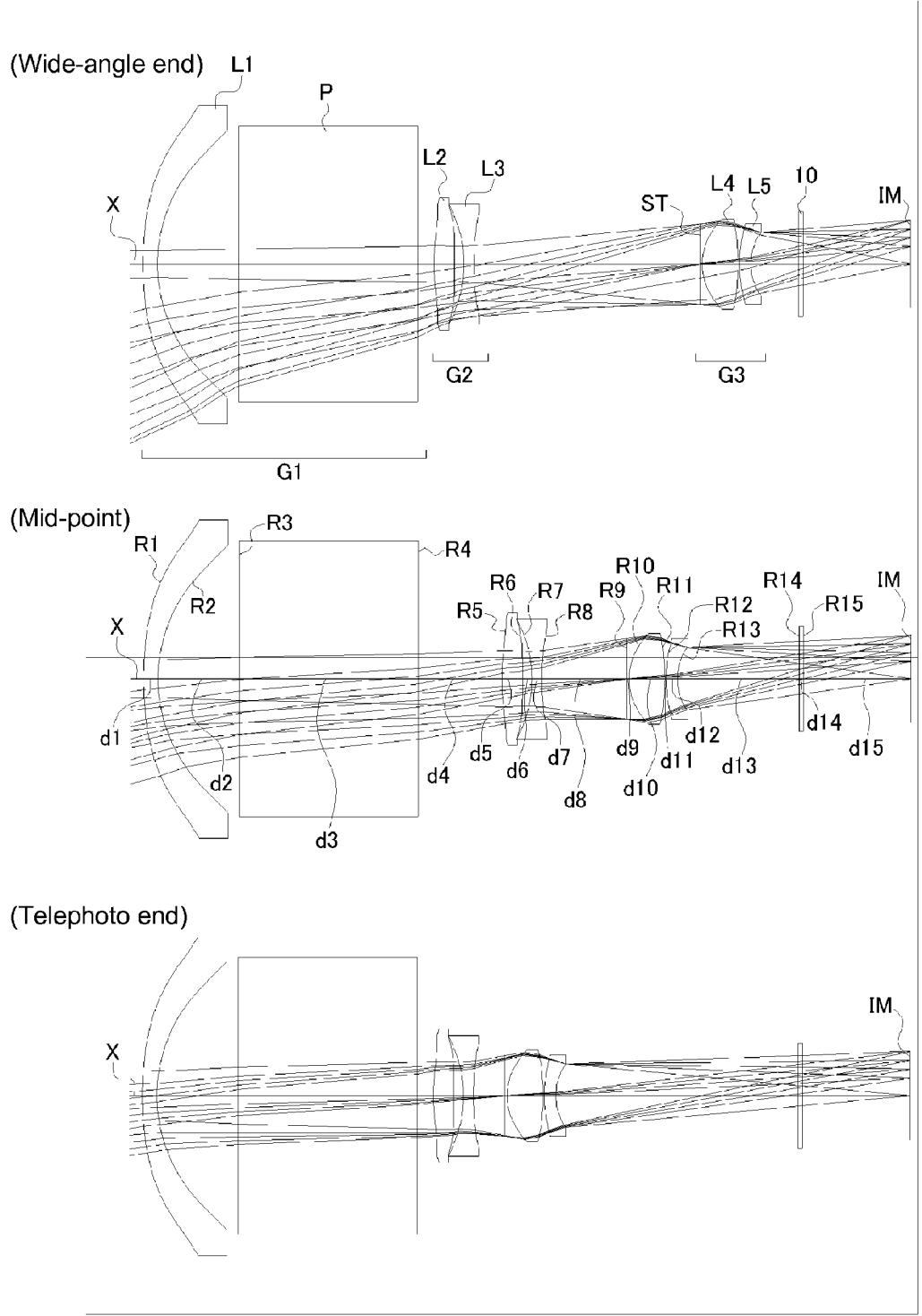
FIG. 1 shows sectional views of a zoom lens at a wide-angle end, a mid point, and a telephoto end in Numerical Data Example 1 according to an embodiment of the invention.
Figure 6:
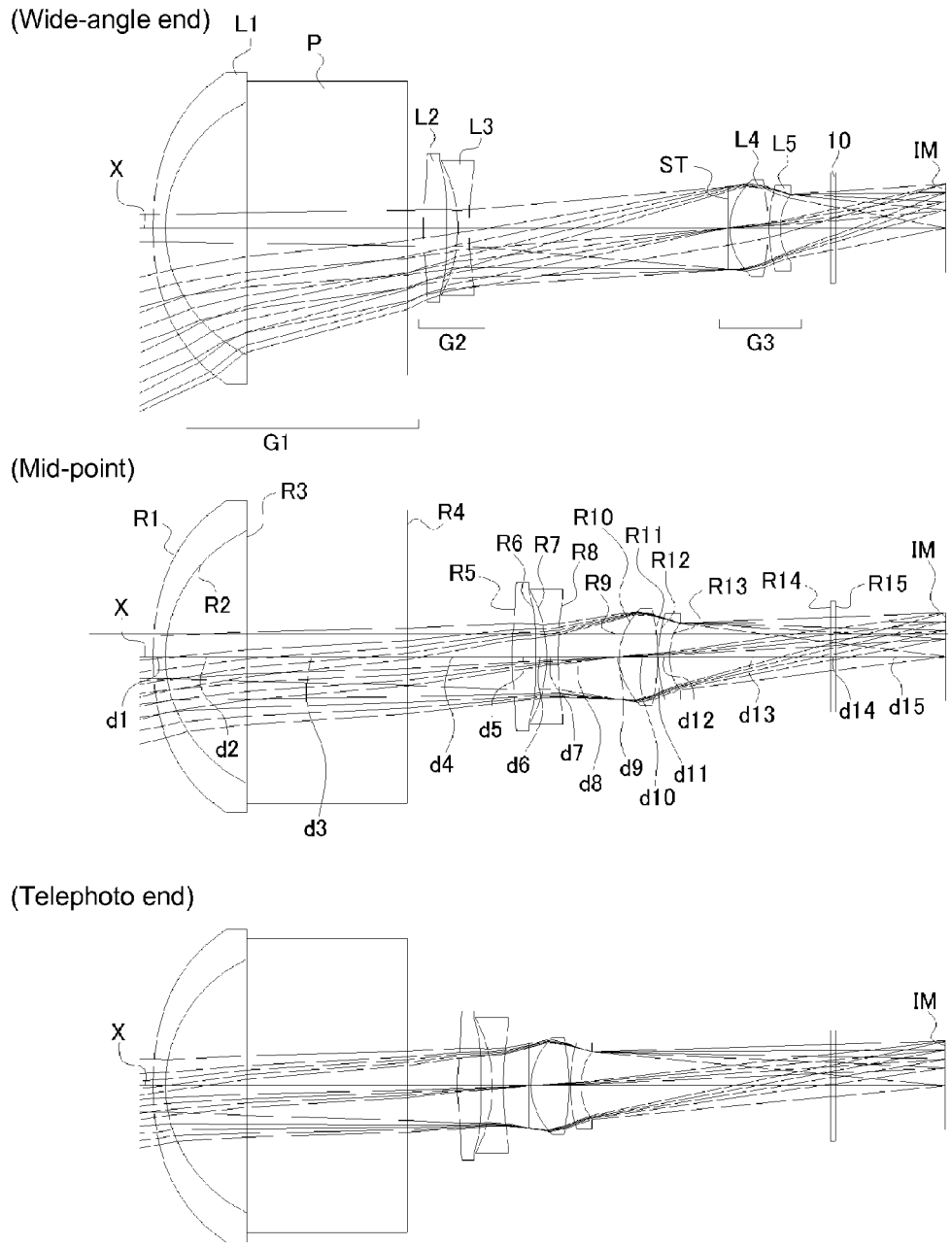
FIG. 6 shows sectional views of a zoom lens at a wide-angle end, a mid point, and a telephoto end in Numerical Data Example 2 according to the embodiment of the invention.
Figure 11:
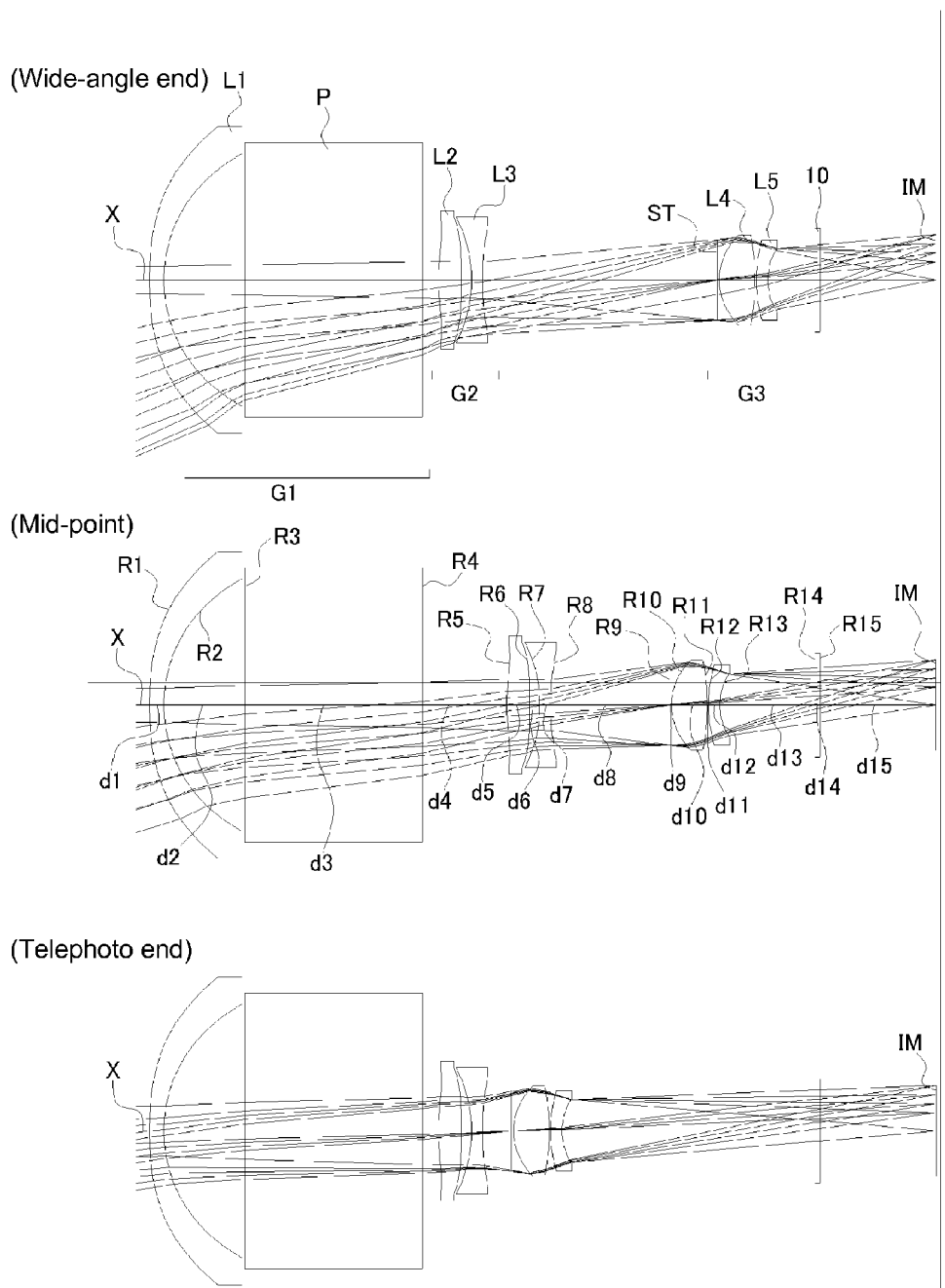
FIG. 11 shows sectional views of a zoom lens at a wide-angle end, a mid point, and a telephoto end in Numerical Data Example 3 according to the embodiment of the invention.

Hereunder, referring to the accompanying drawings, an embodiment of the present invention will be fully described. FIGS. 1, 6, and 11 are sectional views of zoom lenses in Numerical Data Examples 1 to 3 according to the embodiment, respectively. The figures show a lens sectional view at a wide-angle end, a lens sectional view at a mid-point between the wide-angle end and a telephoto end, and a lens sectional view at a telephoto end, respectively. Since a basic lens configuration is the same among those Numerical Data Examples, the lens configuration of the embodiment will be described with reference to the lens sectional view of Numerical Data Example 1.

The zoom lens of the embodiment is composed of three lens groups. As shown in FIG. 1, the zoom lens includes a first lens group G1 having negative refractive power; a second lens group G2 having negative refractive power; and a third lens group G3 having positive refractive power, arranged in the order from an object side. A filter 10 is provided between the third lens group G3 and an image plane IM of an imaging element. However, the filter 10 may be optionally omitted.

Furthermore, according to the zoom lens of the embodiment, the first lens group G1 may be secured, and the second lens group G2 and the third lens group G3 may be configured to be movable along an optical axis X. Upon changing magnification from the wide-angle end to the telephoto end in this configuration, the second lens group G2 first moves to an image plane side and then moves to an object side, and the third lens group G3 moves to the object side along the optical axis X. In other words, the second lens group G2 moves along the optical axis X drawing its moving trajectory being concave to the object side, and the third lens group G3 moves along the optical axis X drawing its moving trajectory being a straight line in a direction to become close to the second lens group G2.

Therefore, according to the zoom lens of the embodiment, magnification is changed by moving the third lens group G3, and focusing and back focal length adjustment is done by moving the second lens group G2, so that an image point is maintained at constant over the whole magnification changing range.

According to the zoom lens having the above-described configuration, the first lens group G1 includes a first lens L1 having negative refractive power and a prism P (a light path changing member) to reflect an incident light so as to bend a light path at a right angle. Among them, the first lens L1 is formed so that a curvature radius of a surface thereof on the object side and a curvature radius of a surface thereof on the image plane side are both positive, i.e. so as to have a shape of a meniscus lens directing a convex surface thereof to the object side near the optical axis X.

According to the embodiment, the prism P is used as the light path changing member. Using such prism P as the light path changing member, it is possible to configure a bent-type (L-shaped) zoom lens. In particular, in case of small-sized devices such as cellular phones, space to mount a zoom lens is very limited, and there is not enough space in the thickness of the device upon designing. If the invention is applied as a bent-type zoom lens, it is possible to significantly reduce the device thickness, which can result in miniaturization and thickness reduction of the portable devices.

Here, the light path changing member is not limited to the prism P in the embodiment. For example, it is also possible to dispose a flat mirror behind the first lens L1, so as to reflect an incident light from the first lens L1 to bend the light path at a right angle using the mirror (light path changing member). In addition, when it is relatively easy to secure space to mount the zoom lens, it is also possible to use a lens as the light path changing member. Using a lens as the light path changing member, it is possible to more satisfactorily correct aberrations. In short, the light path changing member may be any optical member as long as composite refractive power of the light path member and the first lens L1 of the first lens group G1 is negative. For example, a prism, a mirror, a lens, or any combination thereof may be used. Here, for convenience, the prism P is shown as a parallel flat plate having a length equivalent to the light path in the respective lens sectional views, FIGS. 1, 6, and 11.

The second lens group G2 includes a second lens L2 having positive refractive power and a third lens L3 having negative refractive power, arranged in the order from the object side. The second lens L2 is formed in a shape so that a curvature radius of a surface thereof on the object side and a curvature radius of a surface thereof on the image plane side are both positive, i.e. so as to have a shape of a meniscus lens directing a convex surface thereof to the object side near the optical axis X. Here, the shape of the second lens L2 is not limited to the shape of a meniscus lens that directs a convex surface thereof to the object side near the optical axis X, and can be any shape as long as the curvature radius of a surface on the object side is positive. Numerical Data Examples 2 to 5 are examples, in which a curvature radius of a surface thereof on the object side is positive and a curvature radius of a surface on the image plane side is negative, i.e. a shape of a biconvex lens near the optical axis X.

The third lens L3 is formed in a shape so that a curvature radius of a surface thereof on the object side is negative and a curvature radius of a surface thereof on the image plane side is positive, i.e. a shape of a biconcave lens near the optical axis X. Here, the shape of the third lens L3 is not limited to the shape of biconcave lens near the optical axis X and can be any as long as the curvature radius of a surface thereof on the object side is negative. The third lens L3 can be also formed in a shape so that a curvature radius of a surface thereof on the object side and the curvature radius of a surface thereof on the image plane side are both negative, i.e. a shape of a meniscus lens directing a concave surface thereof to the object side near the optical axis X.

In the embodiment, the configuration of the second lens group G2 includes the second lens L2 having positive refractive power and the third lens L3 having negative refractive power, arranged in the order from the object side. The configuration of the second lens G2 can be any as long as composite refractive power of the second lens and the third lens is negative, or can include a second lens having negative refractive power and a third lens having positive refractive power, arranged in the order from the object side.

The third lens group G3 includes a stop ST, a fourth lens L4 having positive refractive power, and a fifth lens L5 having negative refractive power, arranged in the order from the object side. Among them, the fourth lens L4 is formed in a shape of a biconvex lens near the optical axis X. The fifth lens L5 is formed in a shape of a meniscus lens directing a convex surface thereof to the object side near the optical axis X.

In the embodiment, each lens has a lens surface that is formed to be an aspheric surface as necessary. When the aspheric surfaces applied to the lens surfaces have an axis Z in the optical axis direction, a height H in a direction perpendicular to the optical axis, a conical coefficient k, and aspheric coefficients $A_4, A_6, A_6, A_{10}, A_{12}, A_{14}$, and $A_{16}$, a shape of the aspheric surfaces of the lens surfaces may be expressed as follows:

$$Z = \frac{\frac{H^2}{R}}{1+\sqrt{1(k+1)\frac{H^2}{R^2}}} + A_4H^4 + A_6H^6 + A_8H^8 + A_{10}H^{10} + A_{12}H^{12} + A_{14}H^{14} + A_{16}H^{16}$$ [Formula 1]

In addition, when the first lens group G1 has a focal length f1, the second lens group G2 has a focal length f2, the third lens group G3 has a focal length f3, a composite focal length of the first lens group G1 to the third lens group G3 at the wide-angle end is fw, the second lens L2 has Abbe's number vd2p, the third lens L3 has Abbe's number vd2n, the fourth lens L4 has Abbe's number vd3p, the fifth lens L5 has Abbe's number vd3n, the zoom lens of the embodiment satisfies the following conditional expressions (1) to (4):

$-0.3 < fw/f1 < -0.05$ (1)

$-0.5 < f3/f1 < -0.1$ (2)

$-0.6 < f3/f2 < -0.3$ (3)

$0.5 < |vd2p-vd2n|/|vd3p-vd3n| < 0.8$ (4)

Here, it is not necessary to satisfy all of the conditional expressions (1) to (4). When any single one of the conditional expressions (1) to (4) is individually satisfied, it is possible to obtain an effect corresponding to the respective conditional expressions and configure a small-sized zoom lens that can provide high image quality and high performance in comparison with a conventional zoom lens.

Next, Numerical Data Examples of the zoom lens of the embodiment will be described. In each Numerical Data Example, a back focal length BF is a distance from a surface of the fifth lens L5 on the image plane side to a paraxial image plane, which is indicated as a length in air, and a total optical track length L is obtained by adding the back focal length BF to a distance from the surface of the first lens L1 on the object side to the surface of the fifth lens L5 on the image plane side.

In addition, i represents a surface number counted from the object side, R represents a curvature radius, d represents a distance between lens surfaces (surface spacing) on the optical axis, Nd represents a refractive index for a d line, and vd represents Abbe's number for the d line, respectively. Here, aspheric surfaces are indicated with surface numbers i affixed with * (asterisk).

Numerical Data Example 1

Basic lens data are shown below.

Unit: mm

Surface Data

| Surface Number i | R | d | Nd | vd |
|---|---|---|---|---|
| (Object) | ∞ | ∞ | | |
| 1* | 22.894 | 0.9000 | 1.52470 | 56.2 |
| 2* | 9.756 | 5.0000 | | |
| 3 | 0.000 | 11.0000 | 1.71300 | 53.9 |
| 4 | 0.000 | Variable | | |
| 5* | 11.390 | 1.2600 | 1.61420 | 26.0 (=vd2p) |
| 6* | 150.296 | 0.5850 | | |
| 7 | -7.726 | 0.6120 | 1.61800 | 63.4 (=vd2n) |
| 8 | 16.195 | Variable | | |
| 9 (Stop) | ∞ | 0.1400 | | |
| 10* | 3.534 | 2.2100 | 1.49700 | 81.6 (=vd3p) |
| 11* | -13.825 | 0.0700 | | |
| 12* | 7.890 | 0.7200 | 1.61420 | 26.0 (=vd3n) |
| 13* | 3.867 | Variable | | |
| 14 | ∞ | 0.3000 | 1.51633 | 64.1 |
| 15 | ∞ | 6.5844 | | |
| (Image Plane IM) | ∞ | | | |

Other Data
Zoom Ratio: 3.877

| | Wide-Angle End | Mid Point | Telephoto End |
|---|---|---|---|
| Whole System Focal Length f | 4.326 | 8.521 | 16.770 |
| F number | 2.605 | 3.627 | 5.433 |
| Half Angle of View ω (°) | 31.97 | 17.58 | 9.15 |
| Image Height | 2.700 | 2.700 | 2.700 |
| Total Optical Track Length L | 47.099 | 47.099 | 47.099 |
| Back Focal Length BF | 9.702 | 14.247 | 21.668 |
| d4 | 1.000 | 5.143 | 1.000 |
| d8 | 13.900 | 5.212 | 1.934 |
| d13 | 2.920 | 7.465 | 14.886 | f1 = -33.183
f2 = -16.650
f3 = 8.184
fw = 4.326
|vd2p - vd2n| = 37.4
|vd3p - vd3n| = 55.6

Aspheric Surface Data

First Surface k = -3.232422E-01, $A_4$ = 2.378219E-04, $A_6$ = -9.479640E-07, $A_8$ = 1.503126E-08, $A_{10}$ = -1.653783E-10
Second Surface k = -5.487345E-02, $A_4$ = 5.057938E-05, $A_6$ = 1.609065E-06, $A_8$ = -1.757842E-08, $A_{10}$ = -1.203175E-10, $A_{12}$ = -2.064675E-12, $A_{14}$ = -1.617405E-14
Fifth Surface k = -1.850000, $A_4$ = -1.260197E-03, $A_6$ = -5.691917E-05, $A_8$ = -4.679930E-06, $A_{10}$ = 1.610750E-07, $A_{12}$ = 2.284490E-08, $A_{14}$ = -2.748551E-10
Sixth Surface k = 5.000000E-01, $A_4$ = -1.864404E-03, $A_6$ = -1.171388E-04, $A_8$ = 9.509283E-07, $A_{10}$ = 4.363748E-07
Tenth Surface k = -7.513911E-01, $A_4$ = 1.037444E-03, $A_6$ = -1.231682E-05

Unit: mm

Eleventh Surface k = −2.611095E−01, $A_4$ = 0.000000, $A_6$ = −4.218384E−06,
$A_8$ = −6.239724E−07, $A_{10}$ = −4.182303E−08
Twelfth Surface k = −1.400000, $A_4$ = 5.532891E−05, $A_6$ = −1.923531E−05,
$A_8$ = −4.376703E−06, $A_{10}$ = −1.011446E−06
Thirteenth Surface k = 9.478743E−01, $A_4$ = 1.695413E−03, $A_6$ = 2.328653E−04,
$A_8$ = −9.189209E−06, $A_{10}$ = −2.252695E−06, $A_{12}$ = −5.441142E−08,
$A_{14}$ = −2.072506E−08, $A_{16}$ = 4.988290E−09

The values of the respective conditional expressions are as follows:

fw/f1 = −0.130
f3/f1 = −0.247
f3/f2 = −0.492
|vd2p − vd2n|/|vd3p − vd3n| = 0.673

Accordingly, the zoom lens of Numerical Data Example 1 satisfies the conditional expressions (1) to (4).

Figure 2:
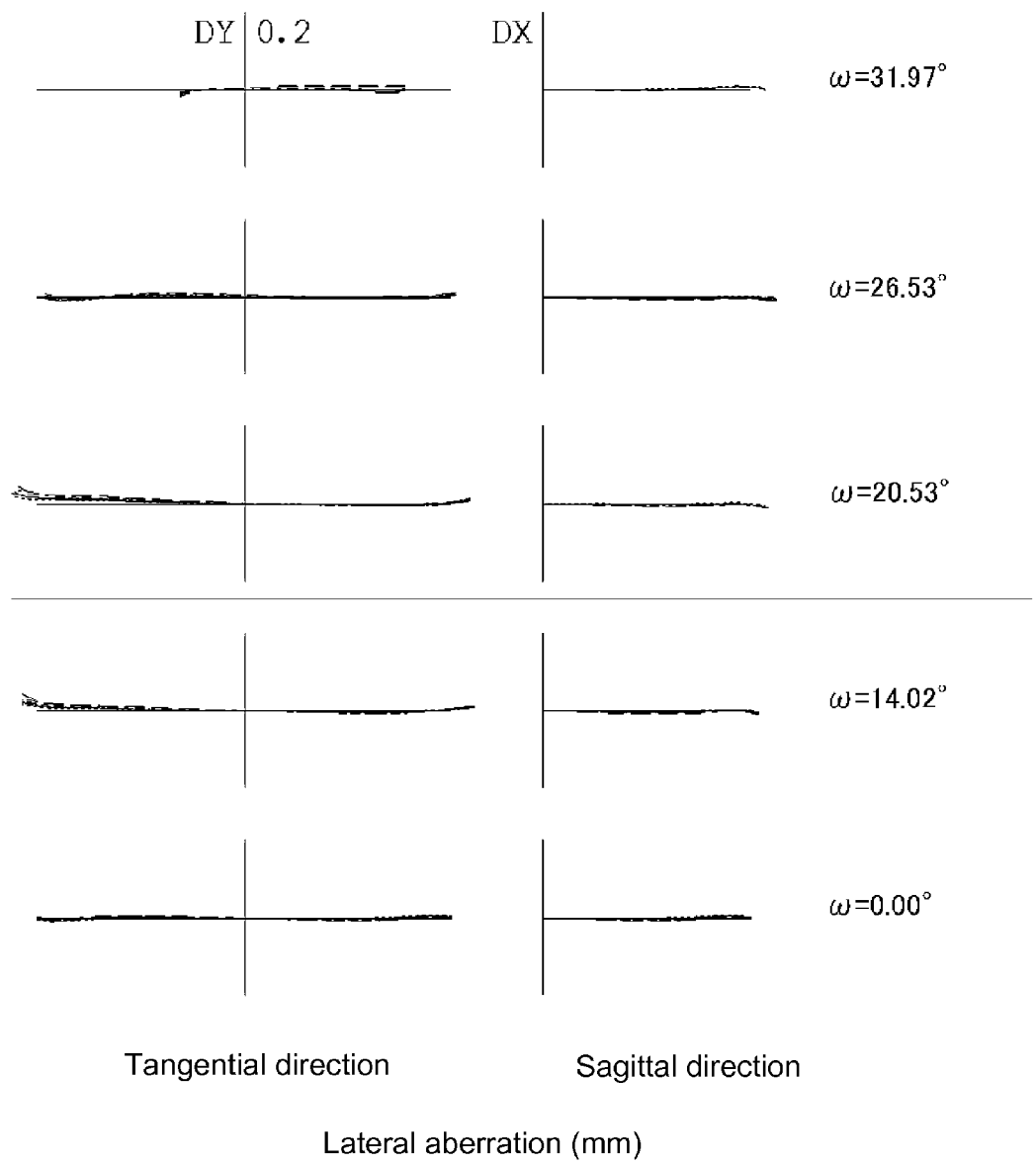
FIG. 2 is an aberration diagram showing a lateral aberration of the zoom lens of FIG. 1 at the wide-angle end.
Figure 3:
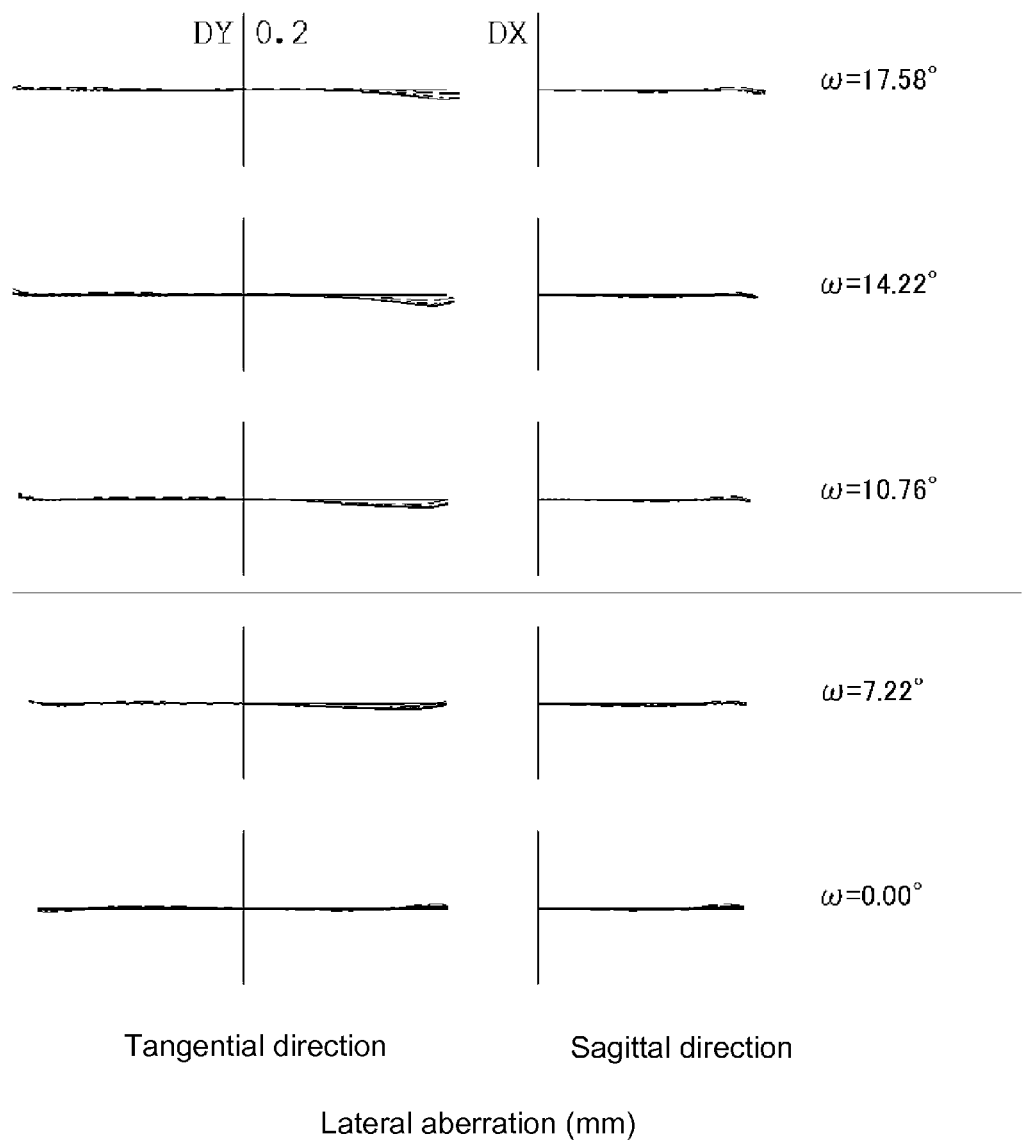
FIG. 3 is an aberration diagram showing a lateral aberration of the zoom lens of FIG. 1 at the mid point.
Figure 4:
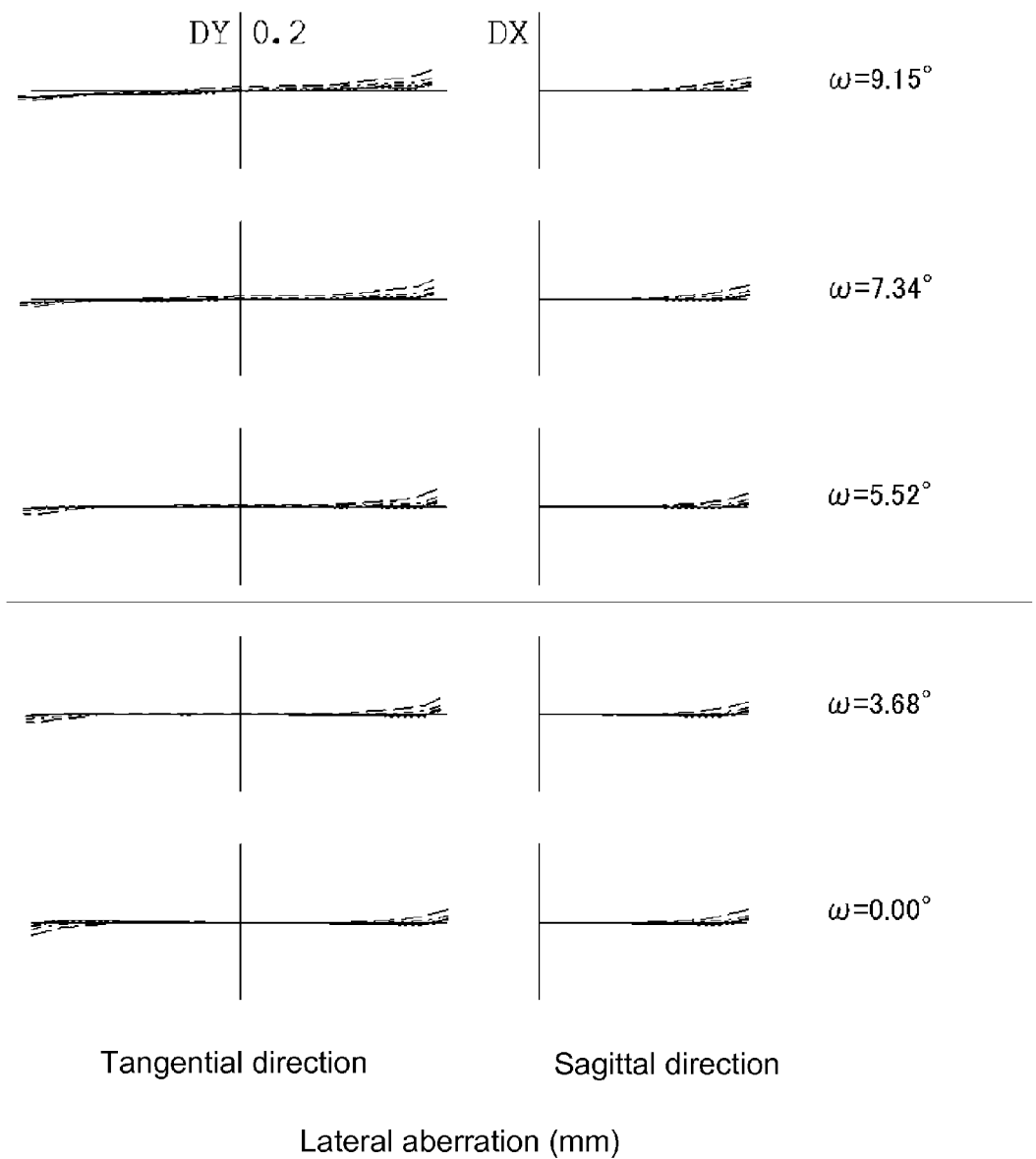
FIG. 4 is an aberration diagram showing a lateral aberration of the zoom lens of FIG. 1 at the telephoto end.

FIGS. 2 to 4 show a lateral aberration that corresponds to a half angle of view ω in the zoom lens of Numerical Data Example 1 by dividing into a tangential direction and sagittal direction (which is also the same in FIGS. 7 to 9, and FIGS. 12 to 14). Among them, FIG. 2 shows a lateral aberration at the wide-angle end (W) (which is the same in FIGS. 7 and 12), FIG. 3 shows a lateral aberration at a mid point (N) (which is the same in FIGS. 8 and 13), and FIG. 4 shows a lateral aberration at the telephoto end (T) (which is the same in FIGS. 9 and 14).

Figure 5:
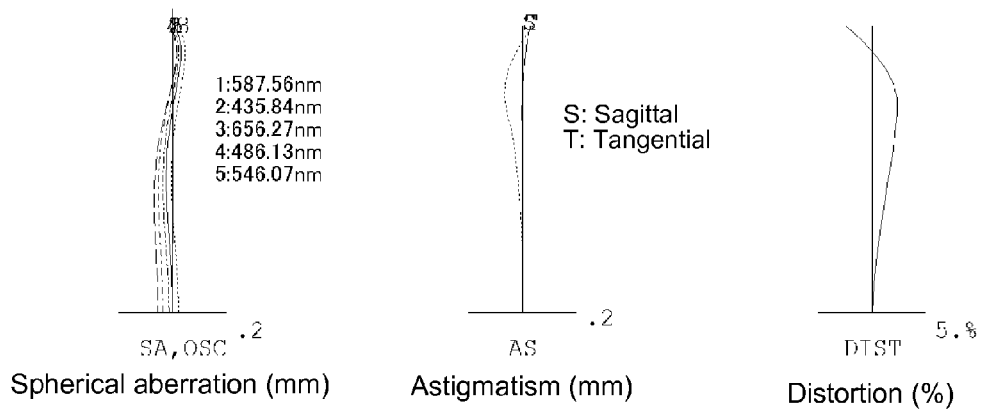
FIG. 5 is an aberration diagram showing a spherical aberration, an astigmatism, and a distortion of the zoom lens of FIG. 1.
Figure 5:
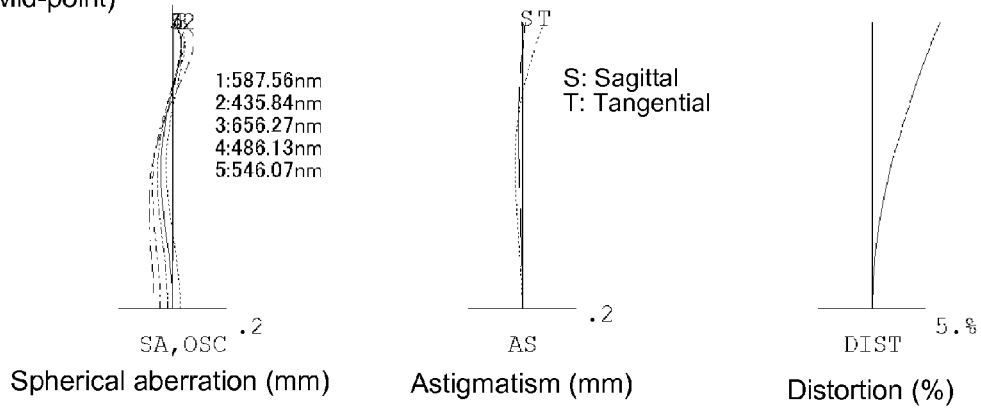
Figure 5:
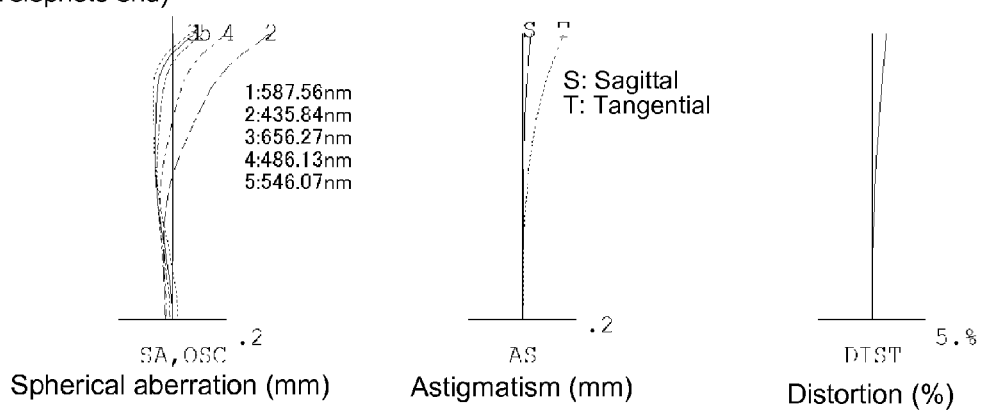

Furthermore, FIG. 5 shows a spherical aberration SA (mm), an astigmatism AS (mm), and a distortion DIST (%) of the zoom lens of Numerical Data Example 1, respectively. In FIG. 5, the Offence against the Sine Condition (OSC) is also indicated for the spherical aberration diagram in addition to the aberrations at the respective wavelengths of 587.56 nm, 435.84 nm, 656.27 nm, 486.13 nm, and 546.07 nm. Further, in the astigmatism diagram, the aberration on the sagittal image surface S and the aberration on tangential image surface T are respectively indicated (which are the same in FIGS. 10 and 15). Therefore, according to the zoom lens of Numerical Data Example 1, it is possible to satisfactorily correct aberrations. Here, the respective aberration diagrams, FIGS. 2 to 5, FIGS. 7 to 10, and FIGS. 12 to 15, respectively show aberrations at object distance=infinite (∞).

Numerical Data Example 2

Basic lens data are shown below.

Unit: mm

Surface Data

| Surface Number i | R | d | Nd | vd |
|---|---|---|---|---|
| (Object) | ∞ | ∞ | | |
| 1* | 18.252 | 0.8000 | 1.52470 | 56.2 |
| 2* | 8.793 | 5.1300 | | |
| 3 | 0.000 | 10.1000 | 1.71300 | 53.9 |
| 4 | 0.000 | Variable | | |
| 5* | 15.773 | 1.5000 | 1.58500 | 29.0 (=vd2p) |
| 6* | −143.706 | 0.7000 | | |
| 7 | −9.022 | 0.7000 | 1.61800 | 63.4 (=vd2n) |
| 8 | 21.266 | Variable | | |
| 9 (Stop) | ∞ | 0.1500 | | |
| 10* | 3.837 | 2.4000 | 1.49700 | 81.6 (=vd3p) |
| 11* | −14.744 | 0.0700 | | |
| 12* | 8.788 | 0.7000 | 1.58500 | 29.0 (=vd3n) |
| 13* | 4.171 | Variable | | |
| 14 | ∞ | 0.3000 | 1.51633 | 64.1 |
| 15 | ∞ | 6.9336 | | |
| (Image Plane IM) | ∞ | | | |

Other Data
Zoom Ratio: 3.895

| | Wide-Angle End | Mid Point | Telephoto End |
|---|---|---|---|
| Whole System Focal Length f | 4.485 | 11.110 | 17.467 |
| F number | 2.605 | 4.034 | 5.241 |
| Half Angle of View ω (°) | 31.98 | 14.15 | 9.11 |
| Image Height | 2.800 | 2.800 | 2.800 |
| Total Optical Track Length L | 49.881 | 49.881 | 49.881 |
| Back Focal Length BF | 10.331 | 17.308 | 22.878 |
| d4 | 1.000 | 6.595 | 3.170 |
| d8 | 16.300 | 3.727 | 1.583 |
| d13 | 3.200 | 10.177 | 15.747 | f1 = −33.306
f2 = −19.760
f3 = 8.964
fw = 4.485
|vd2p − vd2n| = 34.4
|vd3p − vd3n| = 52.6

Aspheric Surface Data

First Surface k = −3.232422E−01, $A_4$ = 1.579793E−04, $A_6$ = −3.113780E−07,
$A_8$ = 3.276658E−09, $A_{10}$ = 3.595640E−11
Second Surface k = −5.487345E−02, $A_4$ = 1.561082E−05, $A_6$ = 3.196792E−07
Fifth Surface k = −2.000000, $A_4$ = −6.620709E−04, $A_6$ = −2.401432E−05,
$A_8$ = −1.126251E−06, $A_{10}$ = 3.272483E−08, $A_{12}$ = 2.891937E−09,
$A_{14}$ = −1.845412E−11
Sixth Surface k = 5.000000E−01, $A_4$ = −9.941032E−04, $A_6$ = −4.425167E−05,
$A_8$ = 3.365067E−07, $A_{10}$ = 8.685140E−08
Tenth Surface k = −7.513911E−01, $A_4$ = 8.051168E−04, $A_6$ = −5.649812E−06
Eleventh Surface k = −1.729905E−01, $A_4$ = 0.000000, $A_6$ = 2.246011E−07, $A_8$ = 6.870985E−08, $A_{10}$ = 2.600986E−08
Twelfth Surface k = −1.886715, $A_4$ = 5.796865E−05, $A_6$ = −3.768984E−07,
$A_8$ = −1.083125E−06, $A_{10}$ = −2.964459E−07
Thirteenth Surface k = 9.478743E−01, $A_4$ = 1.309170E−03, $A_6$ = 1.530600E−04,
$A_8$ = −3.046220E−06, $A_{10}$ = −2.988755E−07, $A_{12}$ = 1.046141E−07,
$A_{14}$ = −1.838972E−09, $A_{16}$ = −3.830619E−09

The values of the respective conditional expressions are as follows:

fw/f1 = −0.135
f3/f1 = −0.269

-continued

Unit: mm $f3/f2 = -0.454$
$|vd2p - vd2n|/|vd3p - vd3n| = 0.654$

Accordingly, the zoom lens of Numerical Data Example 2 also satisfies the conditional expressions (1) to (4).

Figure 7:
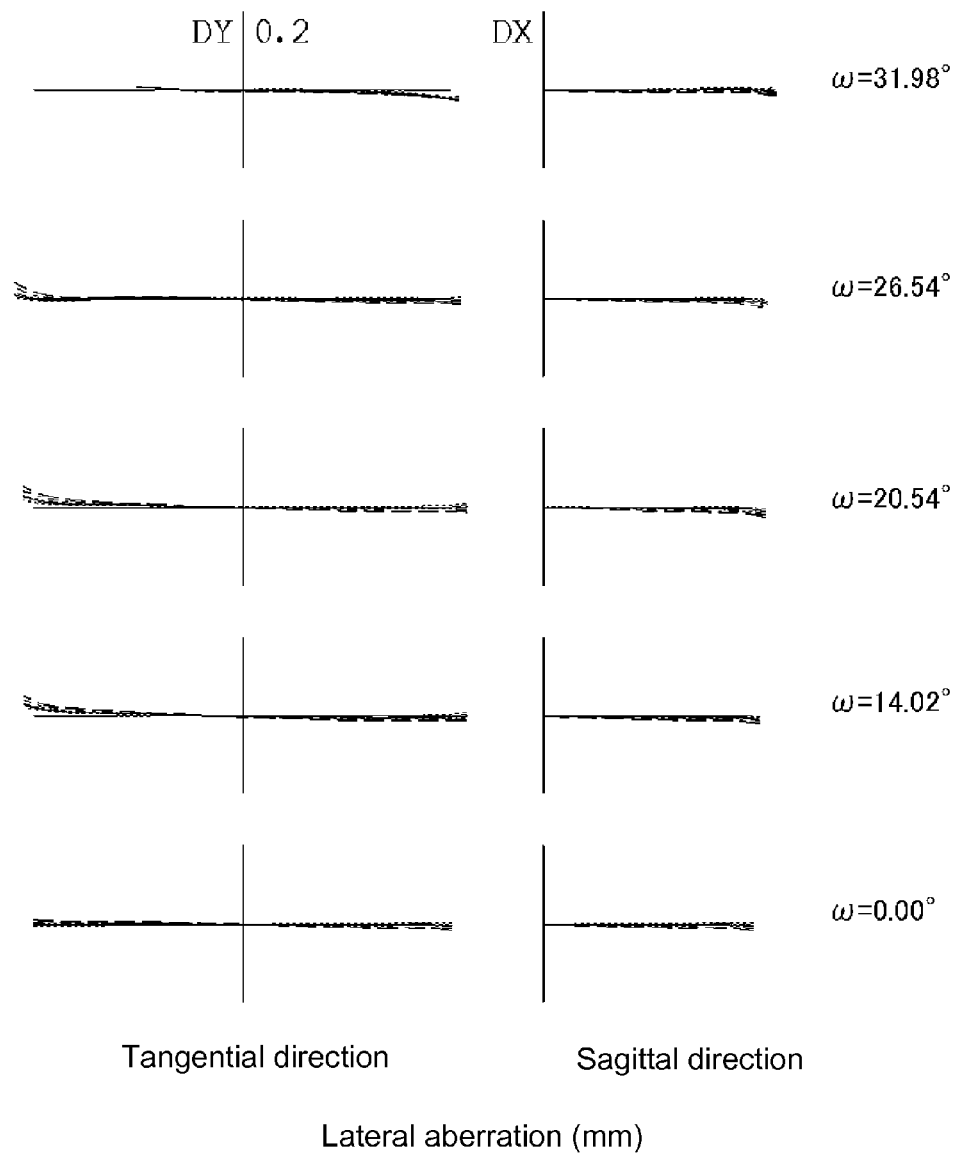
FIG. 7 is an aberration diagram showing a lateral aberration of the zoom lens of FIG. 6 at the wide-angle end.
Figure 8:
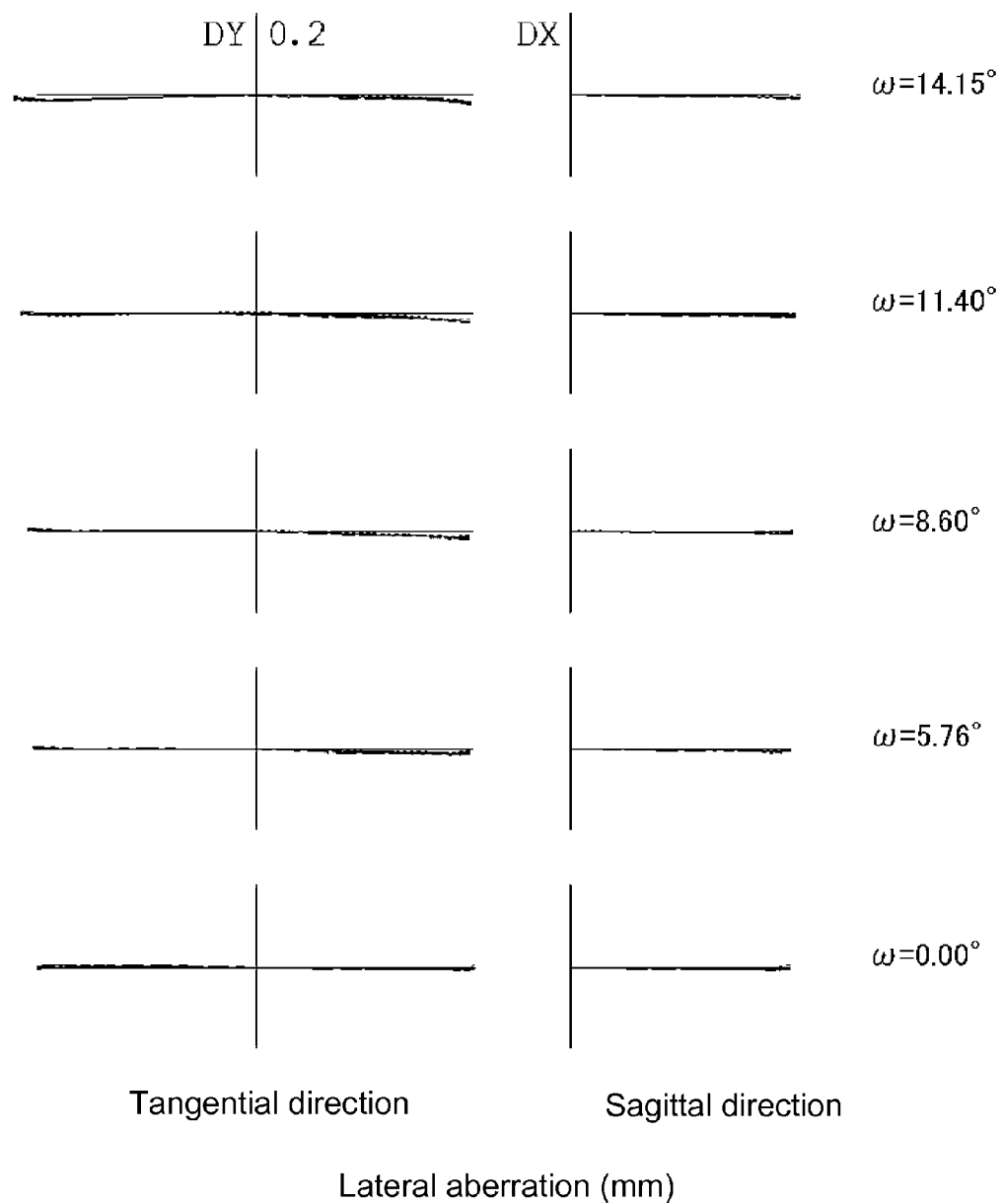
FIG. 8 is an aberration diagram showing a lateral aberration of the zoom lens of FIG. 6 at the mid point.
Figure 9:
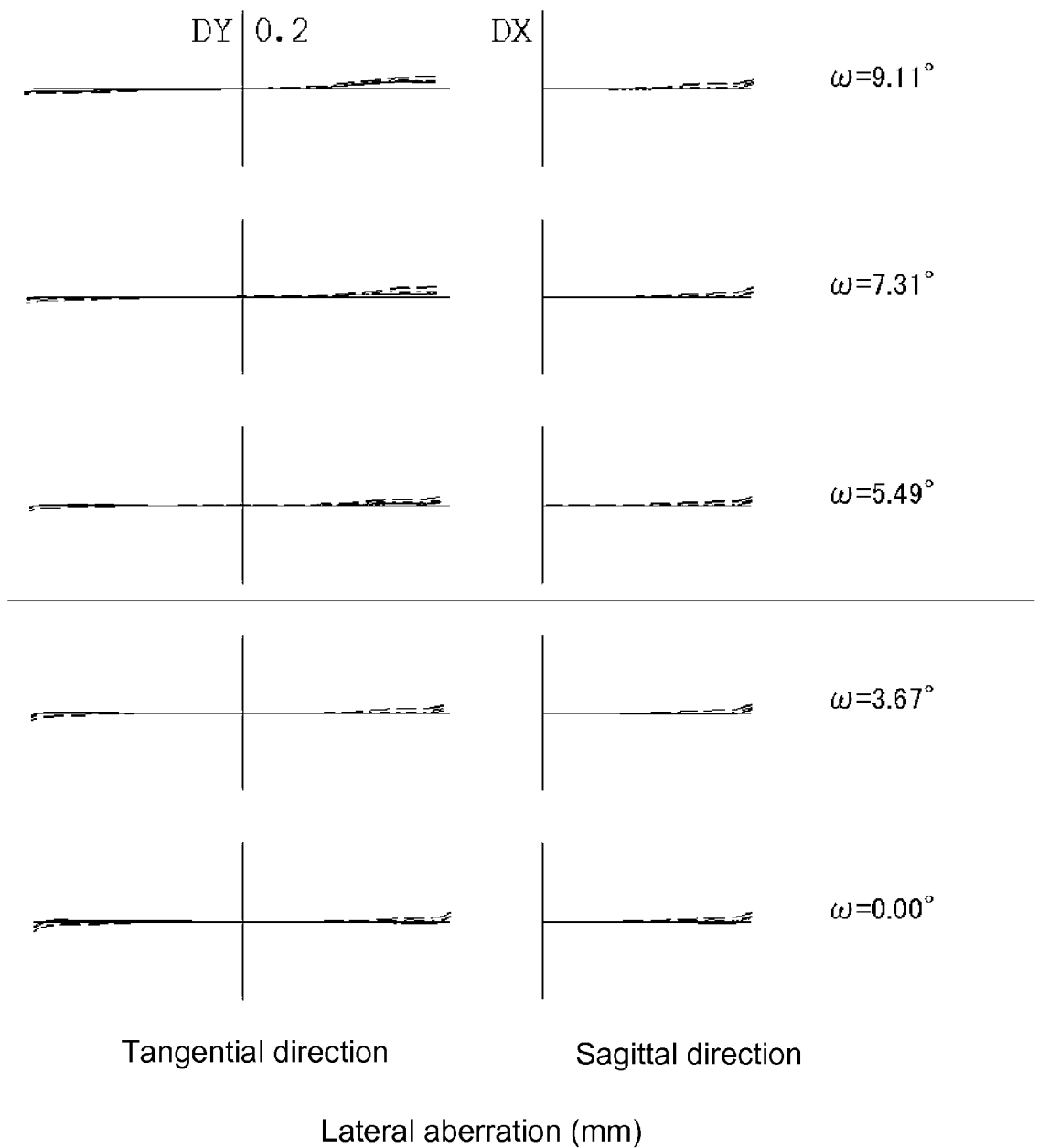
FIG. 9 is an aberration diagram showing a lateral aberration of the zoom lens of FIG. 6 at the telephoto end.
Figure 10:
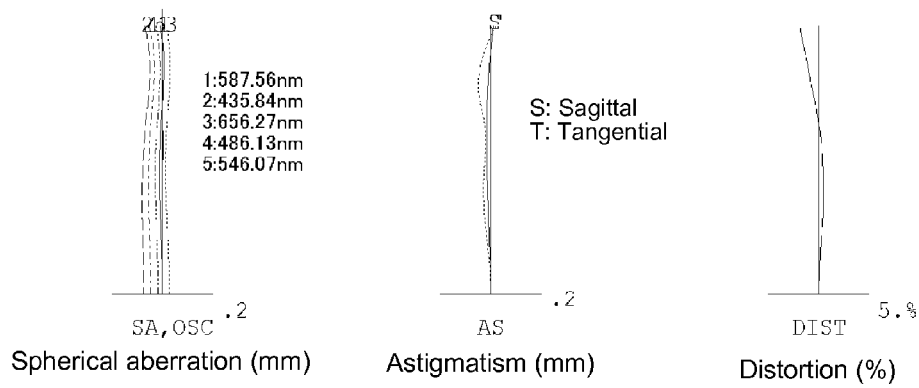
FIG. 10 is an aberration diagram showing a spherical aberration, an astigmatism, and a distortion of the zoom lens of FIG. 6.
Figure 10:
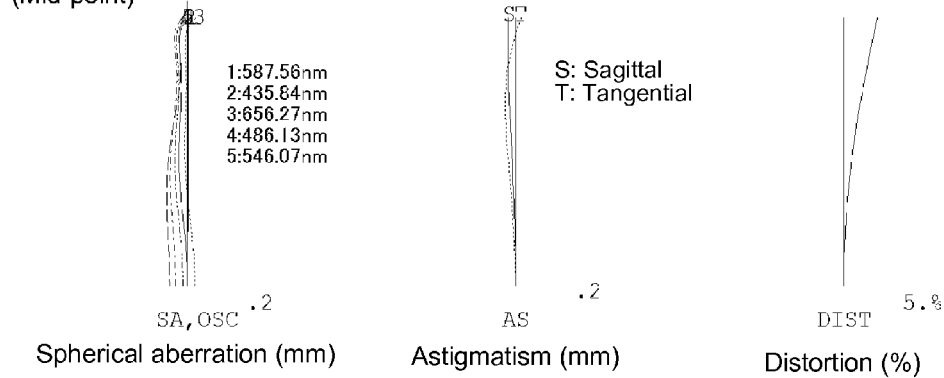
Figure 10:
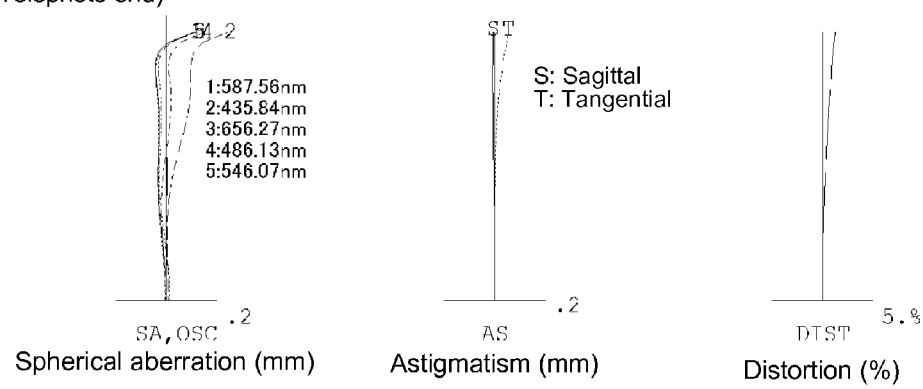

FIGS. 7 to 9 show lateral aberrations that correspond to the half angle of view ω in the zoom lens of Numerical Data Example 2. FIG. 10 shows the spherical aberration SA (mm), the astigmatism AS (mm), and the distortion DIST (%), respectively. Therefore, even with the zoom lens of Numerical Data Example 2, it is possible to satisfactorily correct image surface and satisfactorily correct aberrations.

Numerical Data Example 3

Basic lens data are shown below.

Unit: mm

Surface Data

| Surface Number i | R | d | Nd | vd |
|---|---|---|---|---|
| (Object) | ∞ | ∞ | | |
| 1* | 19.519 | 0.9000 | 1.52470 | 56.2 |
| 2* | 9.086 | 5.0000 | | |
| 3 | 0.000 | 11.0000 | 1.71300 | 53.9 |
| 4 | 0.000 | Variable | | |
| 5* | 14.595 | 1.4000 | 1.61420 | 26.0 (=vd2p) |
| 6* | −221.684 | 0.6500 | | |
| 7 | −8.490 | 0.6800 | 1.61800 | 63.4 (=vd2n) |
| 8 | 18.422 | Variable | | |
| 9 (Stop) | ∞ | 0.1400 | | |
| 10* | 3.614 | 2.2100 | 1.49700 | 81.6 (=vd3p) |
| 11* | −14.898 | 0.0700 | | |
| 12* | 8.288 | 0.7200 | 1.61420 | 26.0 (=vd3n) |
| 13* | 3.960 | Variable | | |
| 14 | ∞ | 0.3000 | 1.51633 | 64.1 |
| 15 | ∞ | 7.1708 | | |
| (Image Plane IM) | ∞ | | | |

Other Data
Zoom Ratio: 3.926

| | Wide-Angle End | Mid Point | Telephoto End |
|---|---|---|---|
| Whole System Focal Length f | 4.610 | 7.266 | 18.101 |
| F number | 2.717 | 3.396 | 5.788 |
| Half Angle of View ω (°) | 31.27 | 21.07 | 8.79 |
| Image Height | 2.800 | 2.800 | 2.800 |
| Total Optical Track Length L | 51.215 | 51.215 | 51.215 |
| Back Focal Length BF | 10.363 | 17.424 | 23.063 |
| d4 | 1.000 | 5.226 | 0.997 |
| d8 | 14.500 | 7.318 | 1.777 |
| d13 | 2.920 | 5.876 | 15.646 |

$f1 = -33.389$
$f2 = -18.202$
$f3 = 8.630$
$fw = 4.610$
$|vd2p - vd2n| = 37.4$
$|vd3p - vd3n| = 55.6$

Unit: mm

Aspheric Surface Data

First Surface $k = -3.232422E-01, A_4 = 2.461558E-04, A_6 = -7.424809E-07,$
$A_8 = 1.668413E-08, A_{10} = -1.243675E-10$
Second Surface $k = -5.487345E-02, A_4 = 8.144623E-05, A_6 = 1.871189E-06,$
$A_8 = -1.178571E-08, A_{10} = -1.799687E-11, A_{12} = -2.409216E-12,$
$A_{14} = 2.097088E-15$
Fifth Surface $k = -2.000000, A_4 = -9.365247E-04, A_6 = -4.235107E-05,$
$A_8 = -2.385914E-06, A_{10} = 5.927485E-08, A_{12} = 7.223636E-09,$
$A_{14} = -5.353479E-11$
Sixth Surface $k = 5.000000E-01, A_4 = -1.361759E-03, A_6 = -7.293523E-05,$
$A_8 = 3.336044E-07, A_{10} = 1.657809E-07$
Tenth Surface $k = -7.513911E-01, A_4 = 1.000158E-03, A_6 = -8.289912E-06$
Eleventh Surface $k = 7.798179E-01, A_4 = 0.000000, A_6 = -1.600505E-06,$
$A_8 = -1.305265E-07, A_{10} = 4.887785E-08$
Twelfth Surface $k = -1.500000, A_4 = 1.072264E-04, A_6 = 4.757766E-06,$
$A_8 = -1.264428E-06, A_{10} = -6.033042E-07$
Thirteenth Surface $k = 9.478743E-01, A_4 = 1.695413E-03, A_6 = 2.156536E-04,$
$A_8 = -8.104906E-06, A_{10} = -9.909974E-07, A_{12} = 2.607879E-07,$
$A_{14} = 1.583277E-08, A_{16} = -2.014458E-09$ The values of the respective conditional expressions are as follows:

$fw/f1 = -0.138$
$f3/f1 = -0.258$
$f3/f2 = -0.474$
$|vd2p - vd2n|/|vd3p - vd3n| = 0.673$

Accordingly, the zoom lens of Numerical Data Example 3 also satisfies the conditional expressions (1) to (4).

Figure 12:
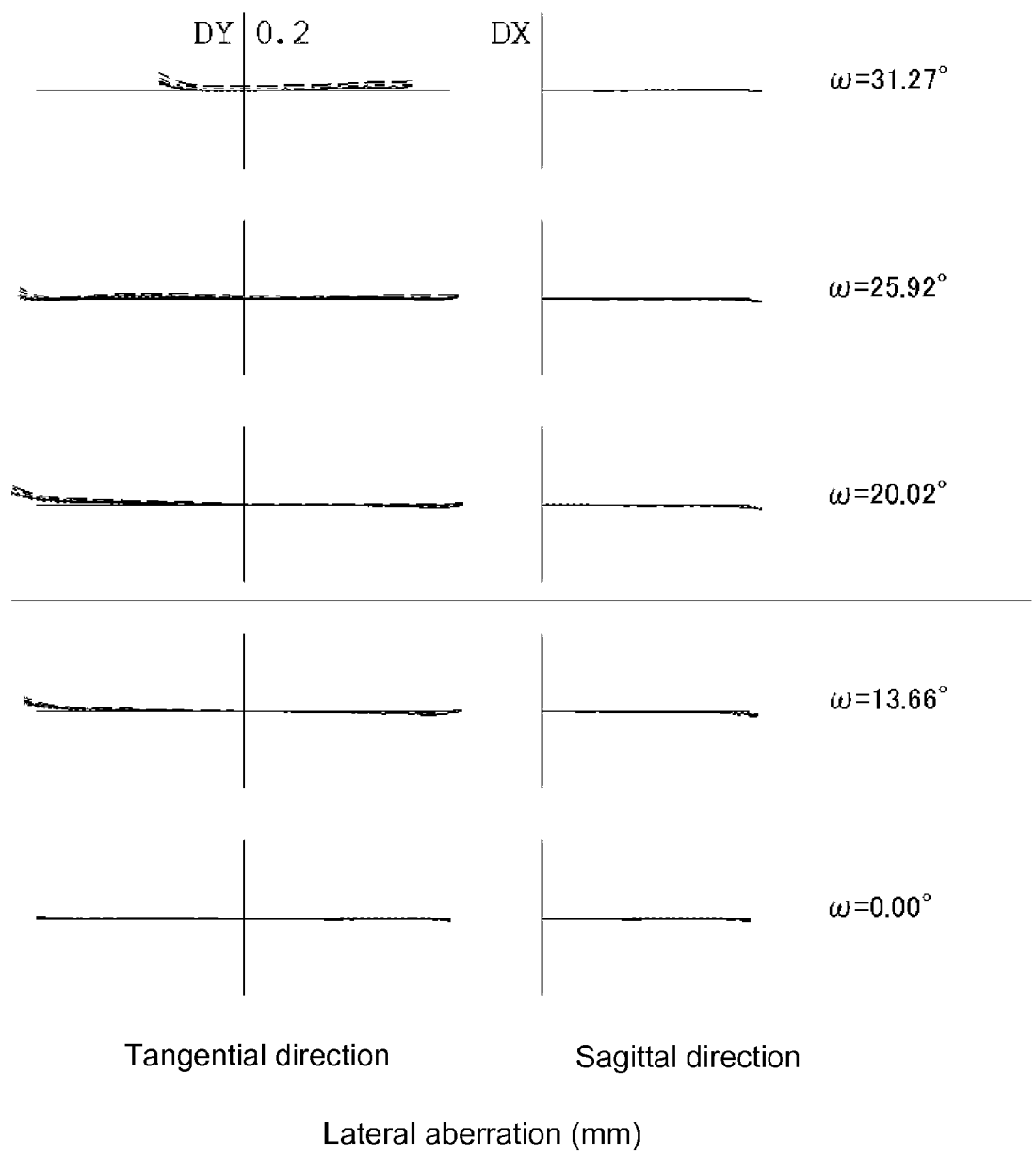
FIG. 12 is an aberration diagram showing a lateral aberration of the zoom lens of FIG. 11 at the wide-angle end.
Figure 13:
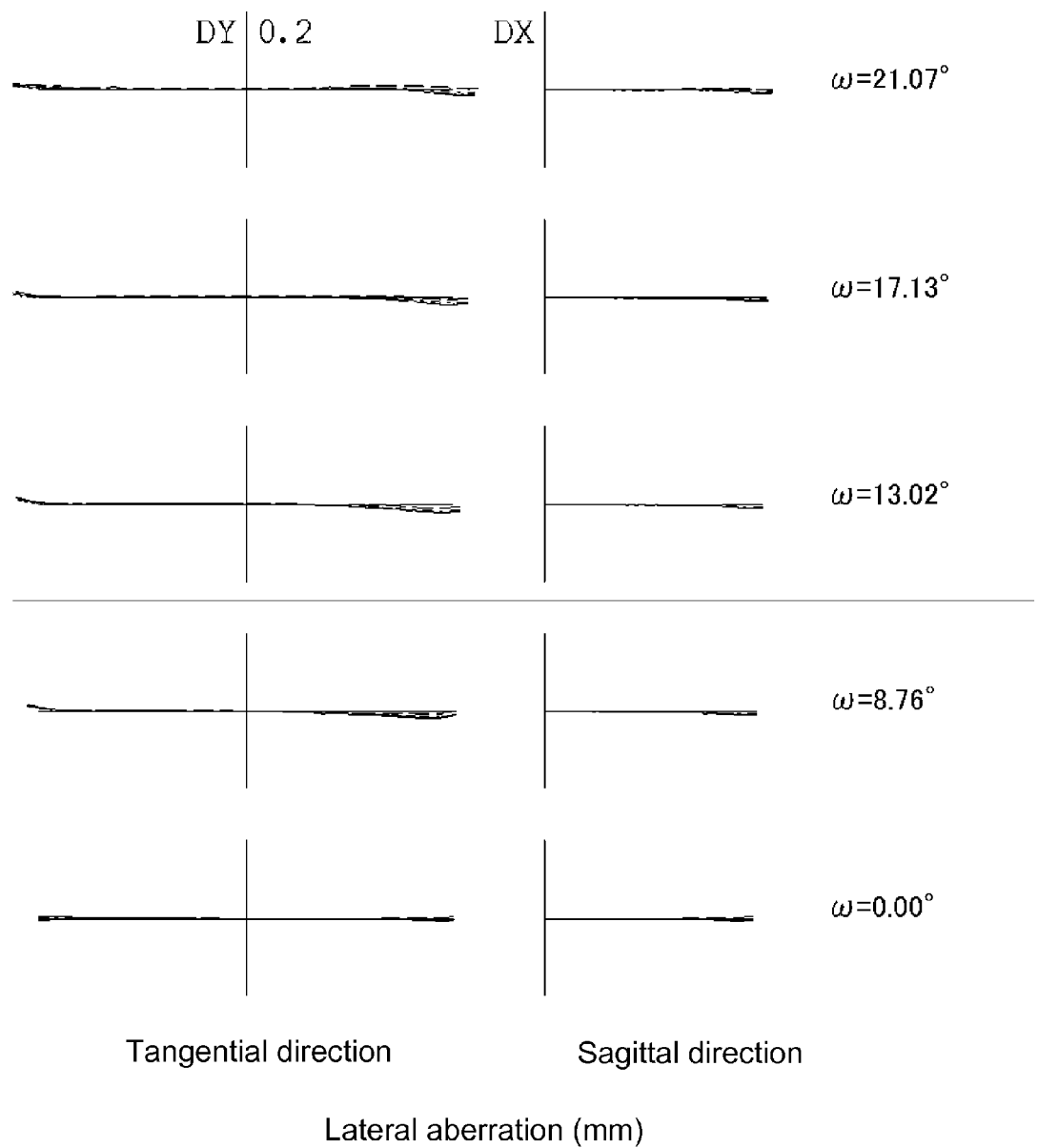
FIG. 13 is an aberration diagram showing a lateral aberration of the zoom lens of FIG. 11 at the mid-point.
Figure 14:
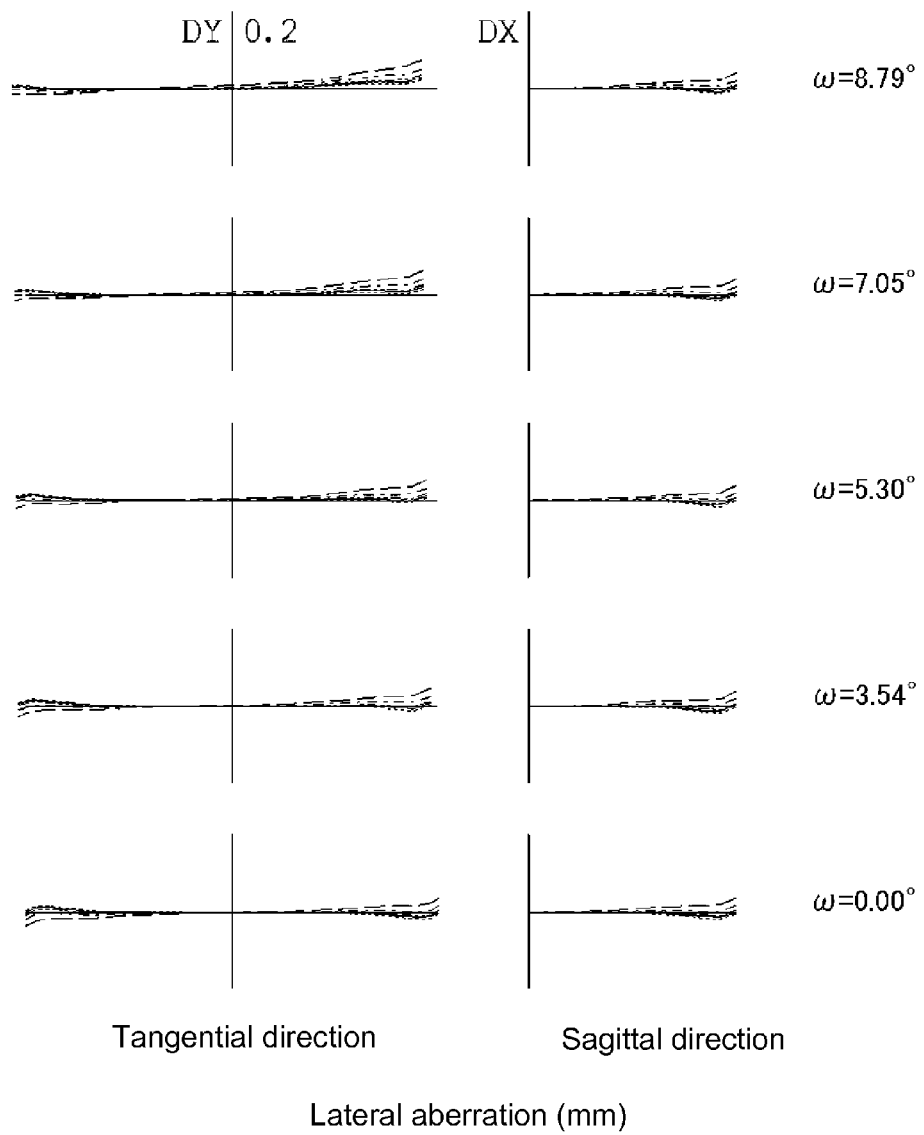
FIG. 14 is an aberration diagram showing a lateral aberration of the zoom lens of FIG. 11 at the telephoto end.
Figure 15:
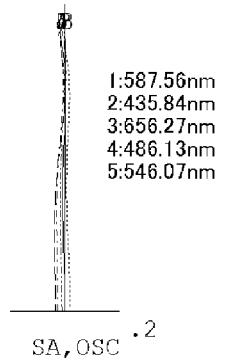
FIG. 15 is an aberration diagram showing a spherical aberration, an astigmatism, and a distortion of the zoom lens of FIG. 11.
Figure 15:
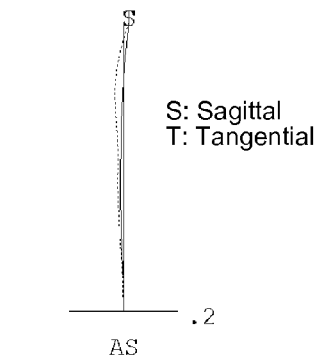
Figure 15:
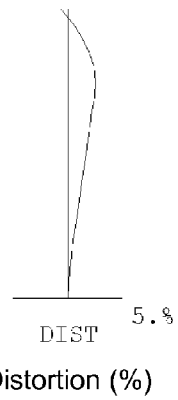
Figure 15:
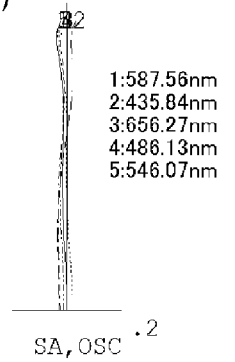
Figure 15:
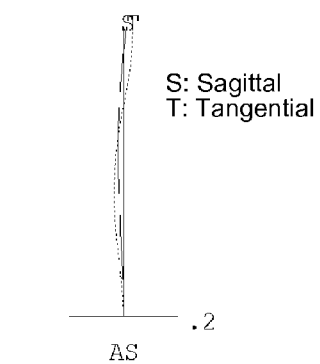
Figure 15:
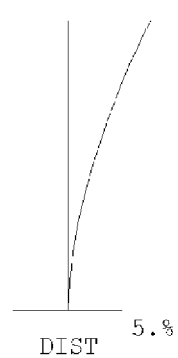
Figure 15:
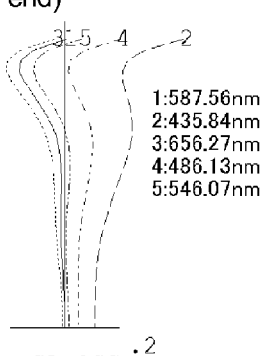
Figure 15:
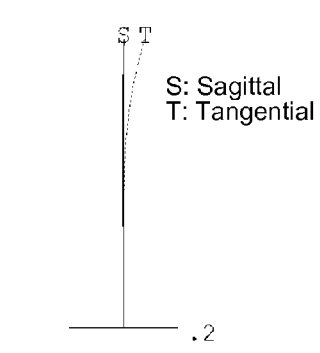
Figure 15:
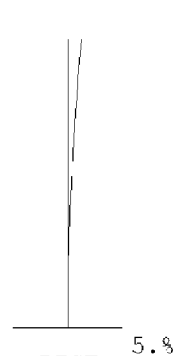

FIGS. 12 to 14 show lateral aberrations that correspond to the half angle of view ω in the zoom lens of Numerical Data Example 3. FIG. 15 shows the spherical aberration SA (mm), the astigmatism AS (mm), and the distortion DIST (%), respectively. Therefore, even with the zoom lens of Numerical Data Example 3, it is possible to satisfactorily correct image surface and suitably correct aberrations.

Therefore, when the zoom lens of the embodiment is applied in an imaging optical system such as cellular phones, digital still cameras, portable information terminals, and security cameras, it is possible to attain both high performances and miniaturization of the camera.

The invention may be applicable in a zoom lens for mounting on a device that require satisfactory aberration correcting ability in addition to a small size thereof, for example, a device such as cellular phones or digital still cameras.

What is claimed is:
1. A zoom lens comprising:
a first lens group having negative refractive power;
a second lens group having negative refractive power; and
a third lens group having positive refractive power, arranged in this order from an object side to an image plane side,
wherein said first lens group includes a first lens having negative refractive power so that a curvature radius of a surface thereof on the image plane side is positive, and a light path changing member for changing a traveling direction of an incident light, said second lens group includes a second lens having positive refractive power so that a curvature radius of a surface thereof on the object side is positive, and a third lens having negative refractive power so that a curvature radius of a surface thereof on the object side is negative, said second lens and said third lens are arranged adjacently from the object side to the image plane side, said third lens group is formed of only two lenses including a fourth lens having positive refractive power and a fifth lens having negative refractive power so that a curvature radius of a surface thereof on the object side is positive, and said first lens group is secured, said second lens group first moves to the image plane side and then moves to the object side, and said third lens group linearly moves to the object side when a magnification of the zoom lens is changed from an wide-angle end to a telephoto end.

2. The zoom lens according to claim 1, wherein said light path changing member is formed of a prism that reflects the incident light to bend a light path thereof.

3. The zoom lens according to claim 1, wherein said first lens group, said second lens group, and said third lens group at the wide-angle end have a composite focal length fw, and said first lens group has a focal length f1 so that the following conditional expression is satisfied:

$$-0.3 < fw/f1 < -0.05.$$

4. The zoom lens according to claim 1, wherein said first lens group has a focal length f1 and said third lens group has a focal length f3 so that the following conditional expression is satisfied:

$$-0.5 < f3/f1 < -0.1.$$

5. The zoom lens according to claim 1, wherein said second lens group has a focal length f2 and said third lens group has a focal length f3 so that the following conditional expression is satisfied:

$$-0.6 < f3/f2 < -0.3.$$

6. The zoom lens according to claim 1, wherein said second lens group includes the second lens having an Abbe's number vd2p and the third lens having an Abbe's number vd2n, and said third lens group includes the fourth lens having an Abbe's number vd3p and the fifth lens having an Abbe's number vd3n so that the following conditional expression is satisfied:

$$0.5 < |vd2p - vd2n|/|vd3p - vd3n| < 0.8.$$

* * * * *